United States Patent [19]
Hayes et al.

[11] Patent Number: 5,788,314
[45] Date of Patent: Aug. 4, 1998

[54] VEHICLE SEAT RETENTION SYSTEM

[75] Inventors: Clayton James Hayes, Romeo; Michel Louis Duchesneau, Novi; Peter Laze, Madison Heights; Michele Rosario Palomba, Sterling Heights, all of Mich.

[73] Assignee: General Motors Corporation, Detroit, Mich.

[21] Appl. No.: 549,594

[22] Filed: Oct. 27, 1995

[51] Int. Cl.[6] ........................................ B60N 2/00
[52] U.S. Cl. .............................. 296/63; 248/503.1
[58] Field of Search ............... 296/63, 65.1; 297/378.13, 297/463.1, 463.2, 452; 248/503.1

[56] References Cited

U.S. PATENT DOCUMENTS

| | | | |
|---|---|---|---|
| 4,742,984 | 5/1988 | Cote et al. | 297/452 X |
| 4,822,092 | 4/1989 | Sweers | 296/63 |

Primary Examiner—Ed L. Swinehart
Attorney, Agent, or Firm—Patrick M. Griffin

[57] ABSTRACT

An automotive vehicle seating system which in a preferred embodiment includes a rigid surface fixed with respect to the vehicle, the rigid surface having an aperture; a seating surface positioned generally adjacent the rigid surface, the seating surface having a frame, the frame having a portion generally formed as a loop extending into the aperture of the rigid surface; and a molded single-piece plastic retainer having two opposed walls, one of the walls having a lock ramp to aid in an interference fit within the aperture of the fixed surface and the retainer having on one of the opposing walls a collar and a lock ramp on another opposing wall to allow the opposing walls to be locked together and the retainer having a compliant locking finger interlocking into the loop of the seat frame to hold the seat in position within the vehicle.

2 Claims, 3 Drawing Sheets

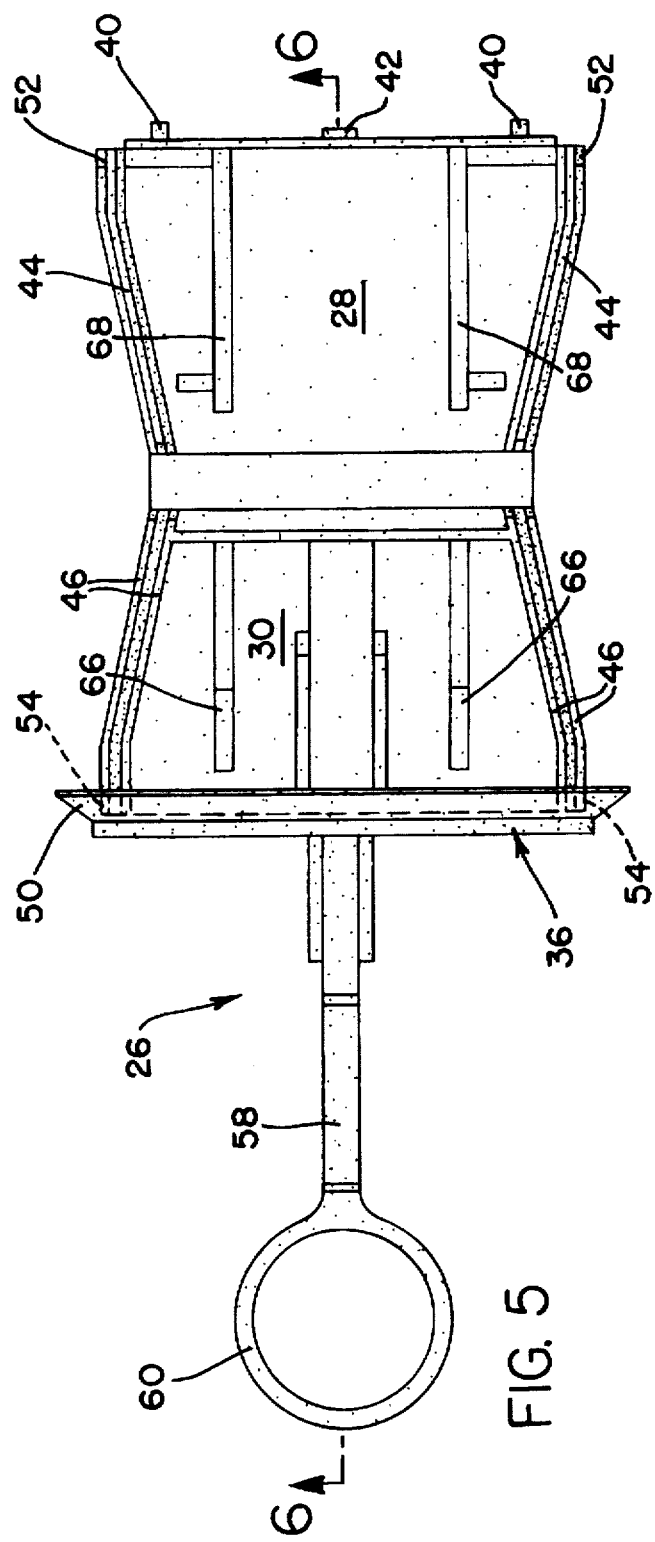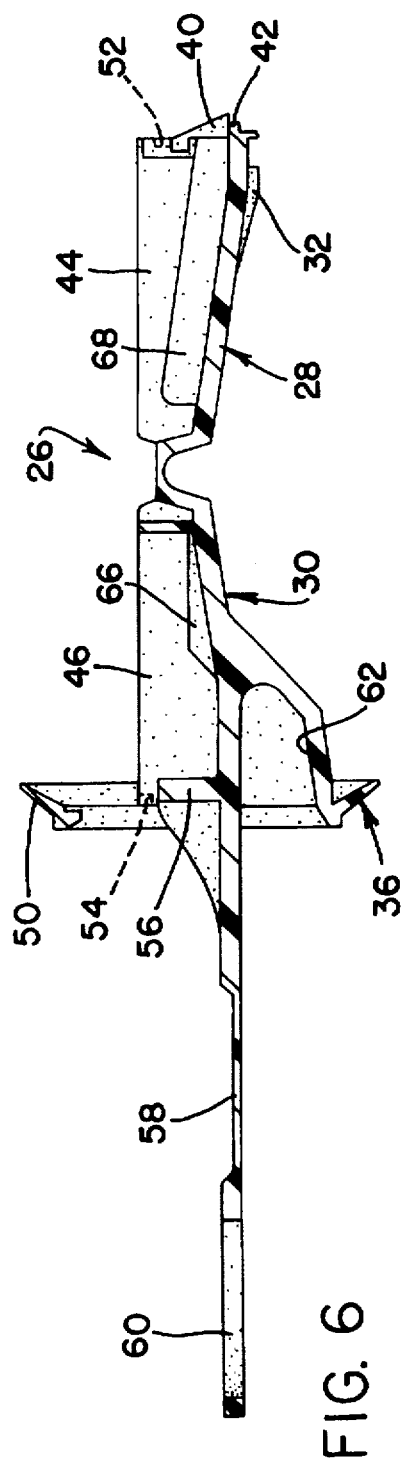
FIG. 5
FIG. 6

VEHICLE SEAT RETENTION SYSTEM

FIELD OF THE INVENTION

The field of the present invention is that of vehicle seating. More particularly, this invention relates to vehicle seating and attachment arrangements thereof particularly useful for rear bench seats of automotive vehicles.

BACKGROUND OF THE INVENTION

Currently, many vehicle bench seats are retained to the floor board of the vehicle or on a post along the floor board of the vehicle by the utilization of threaded fasteners. The use of threaded fasteners is ergonomically burdensome, and it is therefore preferable if the utilization of such fasteners can be easily eliminated. Also, the use of such threaded fasteners severely limits any opportunities for blind assembly.

SUMMARY OF THE INVENTION

The present invention provides a vehicle seat which may be retained to the vehicle without the use of threaded fasteners. Additionally, in its preferred embodiment, the present invention can also provide additional sealing between a vehicle interior compartment and an exterior area.

BRIEF DESCRIPTION OF THE DRAWINGS

FIG. 5 is a top plan view of the retainer shown in FIGS. 2-4 as received from a mold.

FIG. 6 is a view taken along line 6—6 of FIG. 5.

DESCRIPTION OF THE PREFERRED EMBODIMENT

Figure 1:
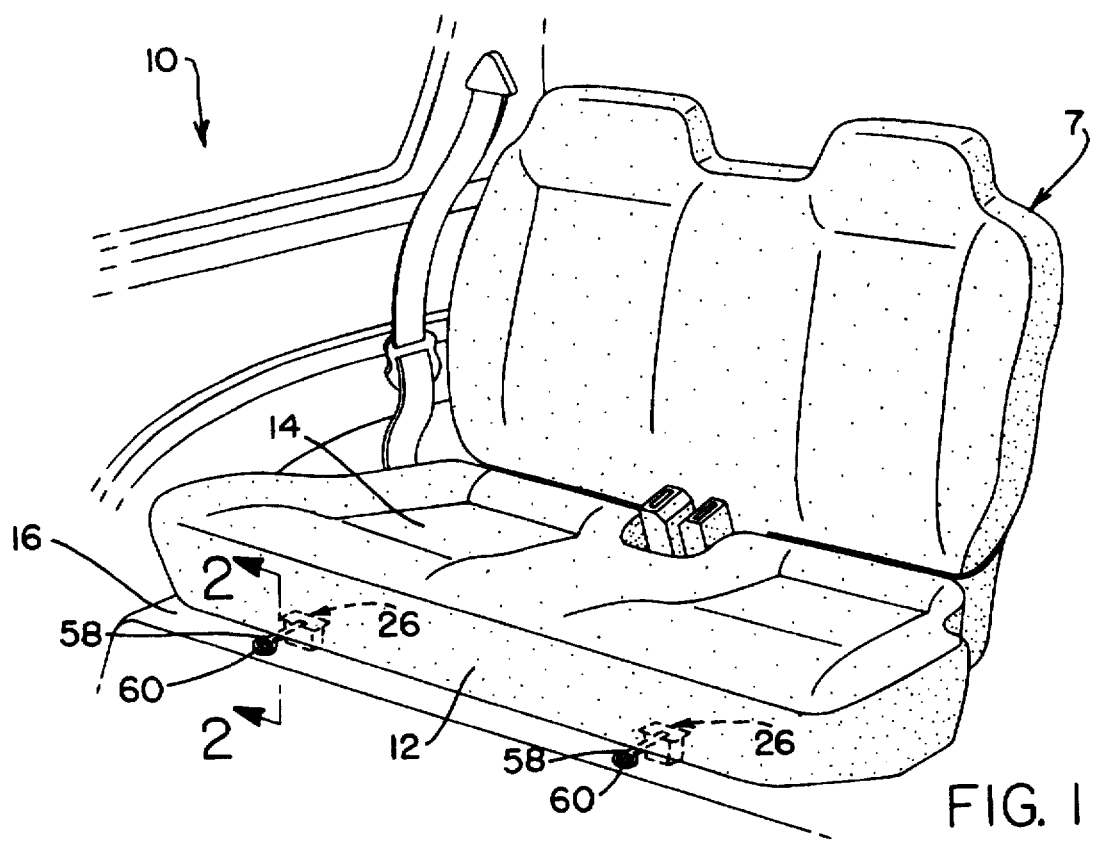
FIG. 1 is a perspective view of a vehicle seat according to the present invention.
Figure 2:
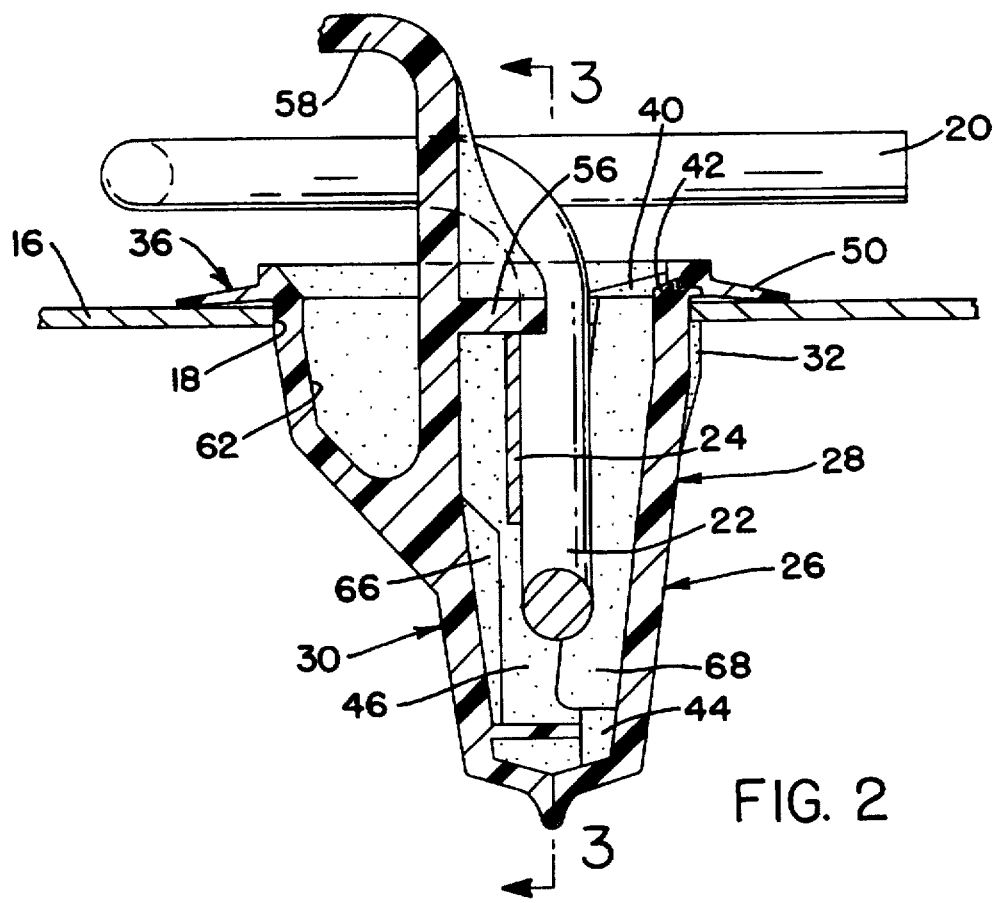
FIG. 2 is a view taken along line 2—2 of FIG. 1.
Figure 3:
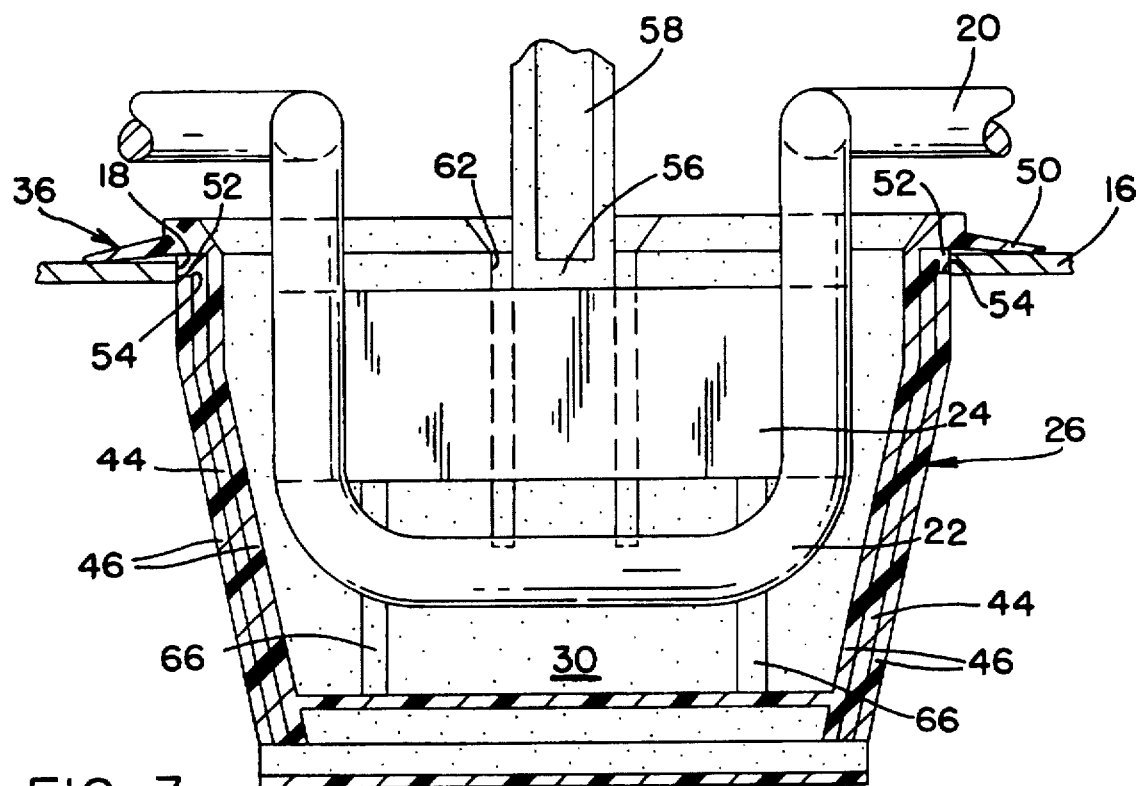
FIG. 3 is a view taken along line 3—3 of FIG. 2.
Figure 4:
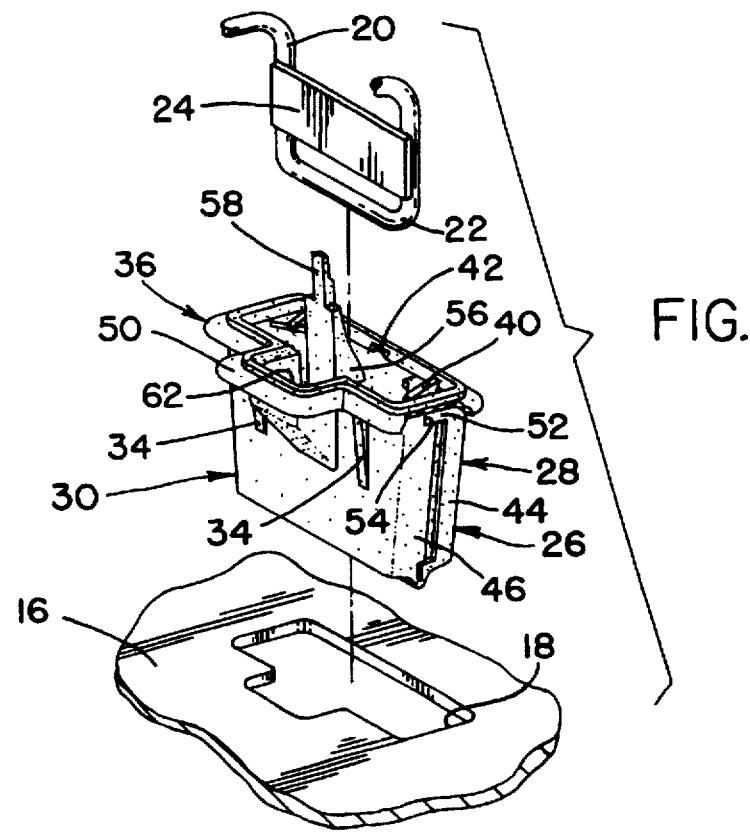
FIG. 4 is an exploded view illustrating installation of the vehicle seat according to the present invention.

Referring to FIGS. 1–6, an automotive vehicle 10 has a vehicle seat 7 with a bench seat cushion 12 which provides a seating surface 14. The bench seat 12 is positioned adjacent a fixed surface of the vehicle provided by a raised portion of the floor panel 16. Within the floor panel 16 is an aperture 18 (best shown in FIG. 4). As is apparent is those familiar with the art, this portion of the floor panel is generally rigid and fixed with respect to the vehicle 10.

The seat cushion 12 has formed therewith a steel rod frame 20 which has a U-bend 22. A cross piece 24 provides a flat which projects into the aperture 18, forming a loop. Positioned within the aperture 18 is a retainer 26. The retainer 26 is typically made from a polymeric material polyamide (nylon) having high load bearing properties. The retainer 26 is a one-piece molding having a rearward wall 28 and a forward wall 30. The rearward wall 28 has a lock ramp 32 which aids in the retention of the retainer and placed within the aperture 18. Additionally, the forward wall 30, which is opposed from the rearward wall 28, has lock ramps 34 to aid in retention of the retainer within the aperture 18. The retainer 26 is sized to have an interference fit within aperture 18 without the lock ramps 32 and 34. However, the lock ramps 32 and 34 further aid in the retention after the retainer 26 is installed.

The forward wall 30 has an attached collar 36. The top edge of the rear wall 28 has two outer lock ramps 40 and a locking tab 42 which in the assembled position lock underneath the collar 36. The lock tab 42 locks into a small notch provided in the inner periphery of the collar 36 to assist in positioning and sealing.

To aid in alignment of the opposed front and rear walls 30 and 28 during assembly and also to ensure sealing, the rearward wall 28 has single-piece side walls 44 which fit between double side walls 46 of the forward wall 30.

Additionally, the collar 36 has a flange portion 50 to aid in sealing the aperture 18. This flange is also placed in a slight interference by virtue of the top of the lock ramps 32 and 34 being in contact with the underside of the rigid floor panels 16. The rear wall 28 also has an alignment stud 52 which fits within an opening 54 of the front wall (FIG. 3) to help ensure the proper alignment of the front and rear walls upon closure.

To retain the crossbar 24 inside of the retainer, there is a locking finger 56. The locking finger may be pulled out of position by pulling on tab 58 by placing one's finger through the loop 60. This pulling in a forward direction allows the locking finger 56 to be pulled into a well 62 formed in the retainer. Internal reinforcing ribs 66 and 68 help provide additional rigidity as well as preventing any portion of the frame 20 from impinging on the front or rear walls 30 and 28.

By utilizing the present invention, retention loads of up to 500 pounds have been obtained during Federal Motor Vehicle Safety Standard (FMVSS) 207 test.

While this invention has been described in terms of a preferred embodiment thereof, it will be appreciated that other forms could readily be adapted by one skilled in the art. Accordingly, the scope of this invention is to be considered limited only by the following claims.

We claim:

1. An automotive vehicle seating system comprising:

a rigid surface fixed with respect to the vehicle, the rigid surface having an aperture;

a seating surface positioned generally adjacent the rigid surface, the seating surface having a frame, the frame having a portion generally formed as a loop extending into the aperture of the rigid surface;

a retainer fixed within the rigid surface aperture, the retainer having two opposed walls and the retainer also having a compliant locking finger interlocking into the loop of the seat frame to hold the seat in position within the vehicle, and, a pull tab on the locking finger to release the locking finger.

2. An automotive vehicle seating system comprising:

a rigid surface fixed with respect to the vehicle, the rigid surface having an aperture;

a seating surface positioned generally adjacent the rigid surface, the seating surface having a frame, the frame having a portion generally formed as a loop extending into the aperture of the rigid surface;

a retainer fixed within the rigid surface aperture, the retainer having two opposed walls and the retainer also having a compliant locking finger interlocking into the loop of the seat frame to hold the seat in position within the vehicle, and, a depression formed in the opposed wall nearest to the locking finger to receive the locking finger as the locking finger is moved to release the seat frame from the retainer.

* * * * *